Dec. 14, 1937.  F. F. POWELL  2,102,483
CULTIVATOR
Filed Jan. 26, 1937   2 Sheets-Sheet 1
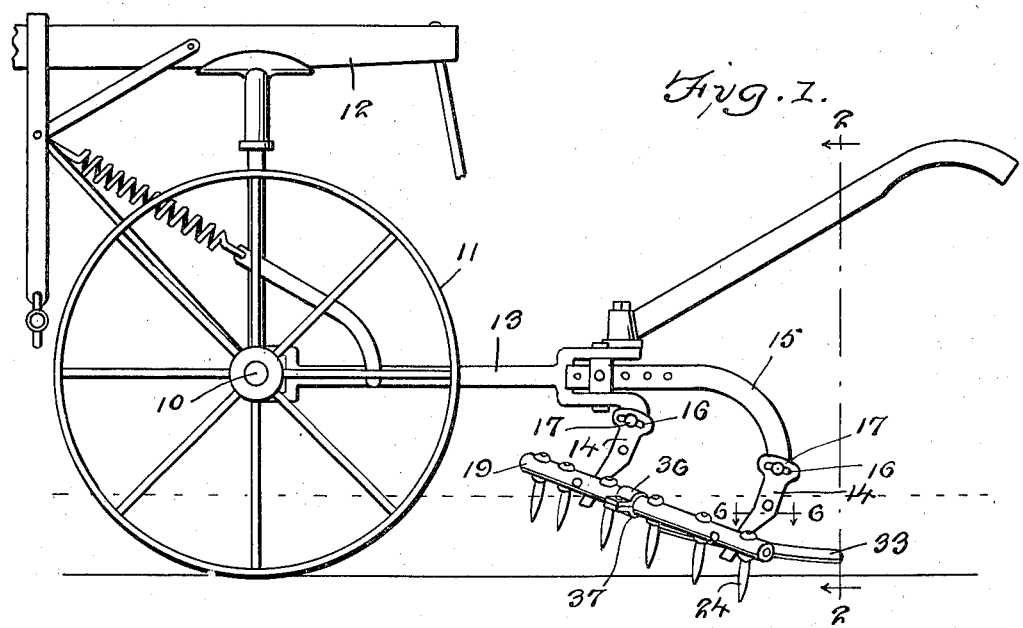
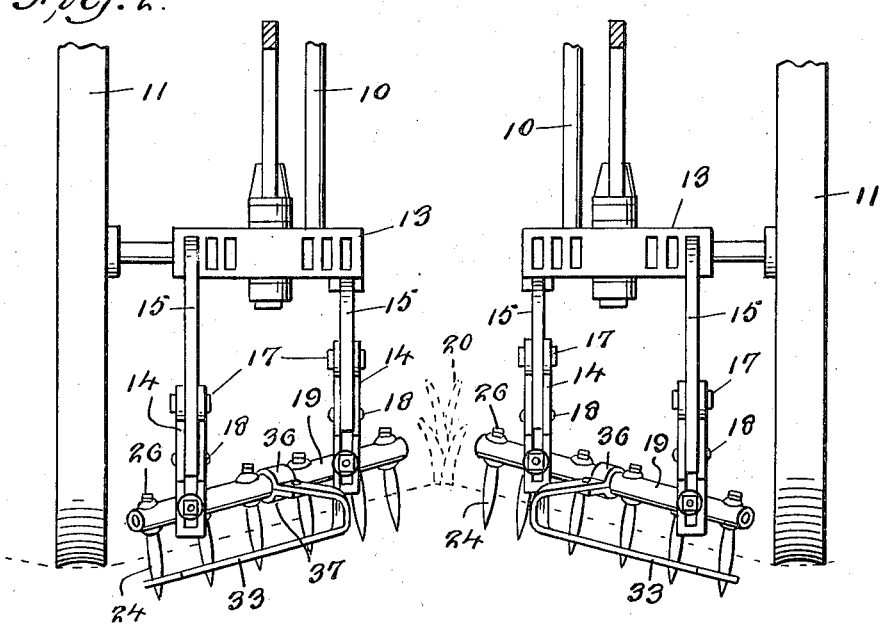
Fred F. Powell
INVENTOR
BY Victor J. Evans & Co.
ATTORNEY Dec. 14, 1937.  F. F. POWELL  2,102,483
CULTIVATOR
Filed Jan. 26, 1937  2 Sheets—Sheet 2
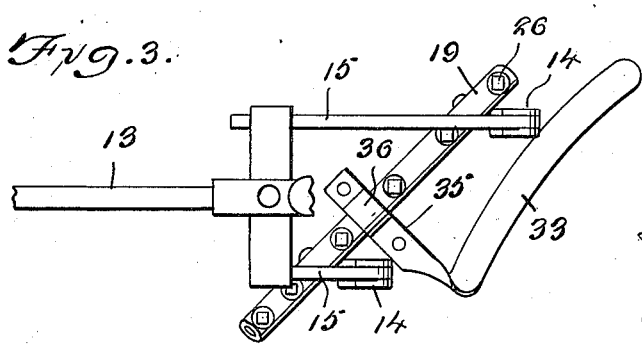
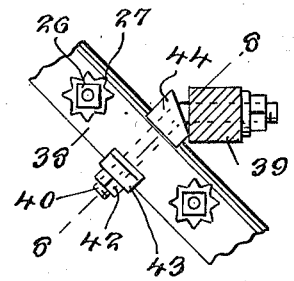
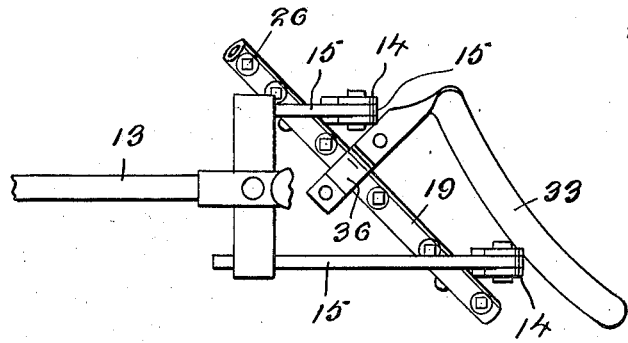
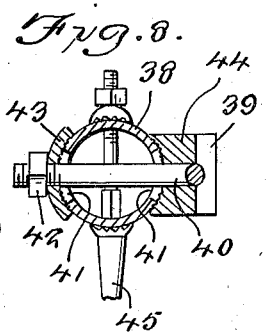
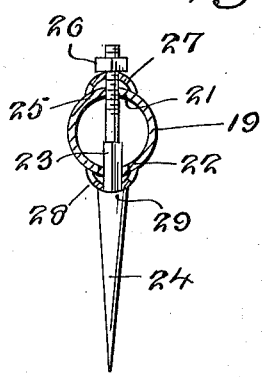
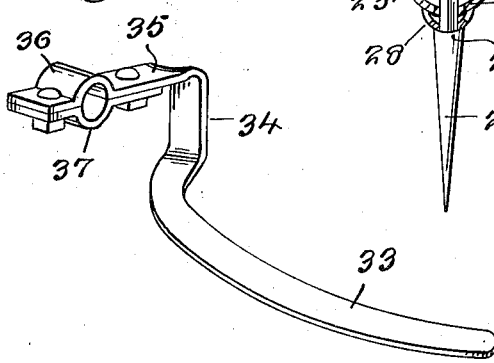
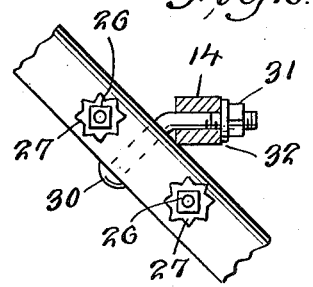
Fred F. Powell
INVENTOR
BY Victor J. Evans & Co.
ATTORNEY Patented Dec. 14, 1937

2,102,483

UNITED STATES PATENT OFFICE 2,102,483

CULTIVATOR

Fred F. Powell, La Valle, Mo.

Application January 26, 1937, Serial No. 122,458

3 Claims. (Cl. 97—179)

This invention relates to cultivators and has for an object to provide an attachment for cultivators more particularly designed for efficiently cultivating cotton or corn, and which will shave off the weeds without throwing too much soil upon the plants.

A further object is to provide a cultivator attachment which may be adjusted to cultivate cotton or corn on level ground, trashy ground, or in rows from about 2½" to 8" high, for this purpose the device having novel bifurcated brackets upon which the tooth bar may be elevated at one end or adjusted to a level position as required.

A further object is to provide a device of this character having blades which are curved in contour so as to shave off the weeds efficiently in rear of the ground mulching teeth.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a side elevation of a cultivator having applied thereto a cotton or corn cultivating attachment constructed in accordance with the invention.

Figure 2 is a cross sectional view taken on the line 2—2 of Figure 1, showing the parts in rear elevation.

Figure 3 is a plan view of the cultivating attachment shown in Figure 2.

Figure 4 is a detail perspective view of one of the blades.

Figure 5 is an enlarged detail sectional view showing one of the teeth attached to the bar.

Figure 6 is a detail cross sectional view taken on the line 6—6 of Figure 1 showing the bifurcated bracket and the bolt for attaching the bar in an anchored position thereto.

Figure 7 is a modified form of the parts shown in Figure 6 and showing clamp washers in which the bar may be adjusted to dispose the teeth at various adjusted positions from the vertical.

Figure 8 is a detail cross sectional view taken on the line 8—8 of Figure 7.

Referring now to the drawings in which like characters of reference designate similar parts in the various views, 10 designates the axle, 11 the wheels, 12 the draft beam, and 13 the beams, one on each side of the cultivator, all of these parts being of conventional form of construction, and to which my improvement may be applied by removing shovels and the like and applying my improvement in lieu thereof.

In carrying out the invention, brackets 14 are provided, one for each shank 15 of the cultivator, and these brackets are bifurcated. The branches of each bracket are provided at the upper ends with slots 16 to receive bolts 17 for adjustably securing the brackets to the shanks, the brackets being pivoted below the bolts to the shanks by pivot bolts 18 so that they may be swung forwardly and rearwardly to vary the horizontal height of the tooth bearing bar 19 with respect to the ground. There is a pair of brackets of equal length for each beam and the innermost shank 15 of each pair is shorter than the outer shank, as best shown in Figure 2, so that the tooth bearing bar 19 is elevated at the inner end to accommodate the slope of the earth at the row of plants 20.

The tooth bearing bar 19 is tubular and is provided with spaced openings arranged in superposed pairs as best shown at 21 and 22 in Figure 5. The lowermost openings are rectangular to receive rectangular stems 23 of ground mulching teeth 24. The stems are uniformly reduced above the rectangular portion and are threaded as shown at 25 to receive nuts 26 for securing the teeth in place. Spider washers 27 and 28 are interposed respectively between the nuts and the bar and between the shoulder 29 at the bottom of the rectangular portion 23, and the bar, these washers being somewhat resilient and performing the function of lock washers.

Each tooth bearing bar is mounted for vertical adjustment in its respective pair of brackets 14 and for this purpose a pair of bolts 30, best shown in Figure 6, are passed through openings in the bar and are passed between the branches of the bifurcated brackets, as best shown in Figures 2 and 6. The bolts are bent intermediate the ends to accommodate the angular relationship of the bar with respect to the brackets and nuts 31 are threaded on to the bolts and confined against washers 32 which bear against the rear sides of the brackets to hold the bolts tightly in position. By loosening the nuts selectively the bar may be elevated at the outer end to assume a level position for cultivating level ground, or the bar may be anchored to assume any desired height at the inner end from 2½" to 8" above the outer end of the bar, according to the requirements of the rows to be cultivated. When the desired adjustment is made the nuts may be again tightened to maintain the bar in adjusted position.

Each tooth bearing bar 19 is provided with a weed cutting blade 33 which is curvilinear in outline and is provided with an upwardly directed forward portion 34 which is integral with a forwardly extending portion 35 having an integral clamp 36 which coacts with the clamp plate 37 in embracing the bar and holding the blade in place. The blade extends in rear of and above the ground mulching teeth, and is adapted to shave off the weeds in rear of the teeth without throwing too much soil upon the growing plants. The cutting edges of the blades may be turned slightly downward so as to pull the blades into the ground in operation.

In Figure 7 there is shown a modified form of device for securing the tooth bearing bar 38 to the branches of the bifurcated bracket 39. In this modified form of device the securing bolt 40 is passed through slots 41 of the diametrically opposite points in the bar 38 and interposed between the nut 42 on the bolt and the bracket 39 are corrugated clamp washers 43 and 44 respectively. When the nut 42 is loosened the bar 38 may be rotated between the clamp washers to dispose the teeth 45 at different angles to the vertical whereupon the nut may again be tightened to hold the bar in the desired adjusted position.

From the foregoing description it is thought to be obvious that a cultivator attachment constructed in accordance with the invention is particularly well adapted for use in cultivating cotton and corn by reason of the convenience and facility with which it may be adjusted to operate under various conditions of service such as level ground, trashy ground, and the cultivation of plants in rows.

What is claimed is:

1. A cultivator attachment including the combination with the shanks of a cultivator, of brackets secured at the upper ends to the shanks for adjustment in an arc downwardly from the shanks, said brackets being bifurcated, a tooth bearing bar, bolts passed through the bar and adjustably secured between the branches of the brackets whereby the bar may be elevated at either end from the horizontal, and a blade carried by the bar and disposed in rear of the bar.

2. The combination with the shanks of a cultivator, of bifurcated brackets having the branches pivoted to and straddling the lower ends of the shanks, bolts mounted for vertical adjustment between the branches of the brackets, a transverse bar carried by the bolts, teeth depending from the bar, and a blade carried by the bar and extending parallel with the bar above the lower ends of the teeth.

3. The combination with the shanks of a cultivator, of brackets pivotally secured at the upper ends to the lower ends of the shanks, means for holding the brackets in adjusted pivotal positions on the shanks, a bar extending transversely of the brackets, bolts adjustably securing the bar for vertical movement on the brackets, clamp washers carried by the bolts and engaging opposite sides of the bar, there being slots in the bar receiving the bolts, said clamp washers holding said bar in adjusted rotary positions on said bolts, teeth depending from the bar, and a blade carried by the bar in rear of the teeth.

FRED F. POWELL.